(12) United States Patent
Mizobuchi

(10) Patent No.: US 10,643,152 B2
(45) Date of Patent: May 5, 2020

(54) LEARNING APPARATUS AND LEARNING METHOD

(71) Applicant: FUJITSU LIMITED, Kawasaki-shi, Kanagawa (JP)

(72) Inventor: Yuji Mizobuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/928,431

(22) Filed: Mar. 22, 2018

(65) Prior Publication Data

US 2018/0285781 A1    Oct. 4, 2018

(30) Foreign Application Priority Data

Mar. 30, 2017  (JP) .................................. 2017-068551

(51) Int. Cl.
   *G06N 20/00*   (2019.01)
   *G06F 17/28*   (2006.01)
   *G06F 16/35*   (2019.01)

(52) U.S. Cl.
   CPC ........... *G06N 20/00* (2019.01); *G06F 16/353* (2019.01); *G06F 17/28* (2013.01)

(58) Field of Classification Search
   CPC ........ G06F 12/00; G06F 16/353; G06F 17/27; G06F 17/28; G06F 17/30; G06N 20/00; G06N 99/00; G09B 19/06
   USPC ............ 382/159, 173; 704/2, 3, 9, 245, 8, 1, 704/236, 244; 706/12, 20; 707/737, 748, 707/749, 769, 738; 434/362; 715/753
   See application file for complete search history.

(56) References Cited

U.S. PATENT DOCUMENTS

| | | | | |
|---|---|---|---|---|
| 5,832,470 A | * | 11/1998 | Morita | .................. G06F 16/355 |
| 5,864,855 A | * | 1/1999 | Ruocco | .................. G06F 16/355 |
| 5,963,940 A | * | 10/1999 | Liddy | ................. G06F 16/3329 |
| 6,151,570 A | * | 11/2000 | Fuji | ..................... G06F 17/2735 704/3 |
| 6,415,283 B1 | * | 7/2002 | Conklin | ............. G06F 16/9027 |
| 6,578,032 B1 | * | 6/2003 | Chandrasekar | ......... G06F 16/30 |

(Continued)

FOREIGN PATENT DOCUMENTS

| | | |
|---|---|---|
| JP | 11-143875 | 5/1999 |
| JP | 2013-20431 | 1/2013 |

OTHER PUBLICATIONS

Guo et al., "Learning Sense-specific Word Embeddings by Exploiting Bilingual Resources", Proceedings of COLING 2014, the 25th International Conference on Computational Linguistics: Technical Papers, Dublin, Ireland, Aug. 23-29, 2014, pp. 497-507.

(Continued)

*Primary Examiner* — Gerald Gauthier
(74) *Attorney, Agent, or Firm* — Staas & Halsey LLP

(57) ABSTRACT

A learning apparatus includes a memory and a processor configured to acquire a plurality of documents, perform clustering of the plurality of documents for each of a plurality of words included in the plurality of document, when a plurality of clusters are generated for a first word among the plurality of words by the clustering, perform assignment of different labels corresponding to the plurality of clusters to the first word included in the plurality of documents, and perform re-clustering of the plurality of documents including the first word with the assigned different labels, for other words among the plurality of words.

13 Claims, 15 Drawing Sheets

(56) References Cited

U.S. PATENT DOCUMENTS

| | | | |
|---|---|---|---|
| 6,751,614 B1* | 6/2004 | Rao | G06F 16/355 |
| 7,584,100 B2* | 9/2009 | Zhang | G06F 16/355 |
| | | | 704/245 |
| 8,566,260 B2* | 10/2013 | Suzuki | G06N 20/00 |
| | | | 706/12 |
| 8,620,842 B1* | 12/2013 | Cormack | G06N 20/00 |
| | | | 706/12 |
| 8,688,448 B2* | 4/2014 | Peters | G06F 17/27 |
| | | | 704/236 |
| 8,818,788 B1* | 8/2014 | Mihalik | G06F 17/2785 |
| | | | 704/1 |
| 8,838,614 B2* | 9/2014 | Koperda | G06F 16/3331 |
| | | | 707/748 |
| 9,002,848 B1* | 4/2015 | Peng | G06F 16/355 |
| | | | 707/737 |
| 9,336,302 B1* | 5/2016 | Swamy | G06F 16/217 |
| 9,436,758 B1* | 9/2016 | Lewis | G06F 16/35 |
| 9,779,086 B2* | 10/2017 | Goto | G06F 17/289 |
| 9,946,787 B2* | 4/2018 | Bigini | G06F 16/3344 |
| 10,248,718 B2* | 4/2019 | Podder | G06F 17/2785 |
| 10,372,816 B2* | 8/2019 | Beller | |
| 2004/0133560 A1* | 7/2004 | Simske | G06F 16/313 |
| 2006/0101102 A1* | 5/2006 | Su | G06F 16/358 |
| 2007/0136220 A1* | 6/2007 | Sakurai | G06N 20/00 |
| | | | 706/20 |
| 2007/0244690 A1* | 10/2007 | Peters | G06F 17/27 |
| | | | 704/8 |
| 2007/0282892 A1* | 12/2007 | Probst | G06F 17/27 |
| 2008/0133479 A1* | 6/2008 | Zelevinsky | G06F 16/338 |
| 2009/0094233 A1* | 4/2009 | Marvit | G06F 16/313 |
| 2009/0106023 A1* | 4/2009 | Miki | G10L 15/183 |
| | | | 704/245 |
| 2010/0205541 A1* | 8/2010 | Rapaport | G06Q 10/10 |
| | | | 715/753 |
| 2011/0004578 A1* | 1/2011 | Momma | G06N 20/00 |
| | | | 706/12 |
| 2011/0098999 A1* | 4/2011 | Amini | G06F 16/353 |
| | | | 704/2 |
| 2011/0231350 A1* | 9/2011 | Momma | G06K 9/6218 |
| | | | 706/12 |
| 2011/0246173 A1* | 10/2011 | Li | G06F 17/2827 |
| | | | 704/2 |
| 2012/0290285 A1* | 11/2012 | Wang | G09B 5/06 |
| | | | 704/2 |
| 2013/0110498 A1* | 5/2013 | Bekkerman | G06F 17/2745 |
| | | | 704/9 |
| 2013/0151555 A1* | 6/2013 | Miyano | G09B 5/00 |
| | | | 707/769 |
| 2014/0127665 A1* | 5/2014 | Arai | G06Q 50/20 |
| | | | 434/362 |
| 2014/0324429 A1* | 10/2014 | Weilhammer | G10L 15/063 |
| | | | 704/244 |
| 2015/0169593 A1* | 6/2015 | Bogdanova | G06F 16/355 |
| | | | 707/738 |
| 2015/0278312 A1* | 10/2015 | Makino | G06F 16/24573 |
| | | | 707/749 |
| 2016/0125245 A1* | 5/2016 | Saitwal | G06T 7/11 |
| | | | 382/173 |
| 2016/0125273 A1* | 5/2016 | Matsunaga | G06K 9/6269 |
| | | | 382/159 |
| 2016/0217704 A1* | 7/2016 | Kojima | G09B 5/06 |
| 2016/0224655 A1* | 8/2016 | Oliver | H04L 51/18 |
| 2017/0177627 A1* | 6/2017 | Singh | G06F 16/353 |
| 2017/0270180 A1* | 9/2017 | State | G06F 16/285 |
| 2018/0032606 A1* | 2/2018 | Tolman | G06F 16/93 |
| 2018/0189387 A1* | 7/2018 | Kim | G06F 17/2785 |
| 2018/0232357 A1* | 8/2018 | Beller | G06F 17/211 |
| 2018/0239822 A1* | 8/2018 | Reshef | G10L 15/26 |
| 2018/0285347 A1* | 10/2018 | Mizobuchi | G06F 17/277 |
| 2018/0285781 A1* | 10/2018 | Mizobuchi | G06F 17/28 |
| 2018/0330279 A1* | 11/2018 | Iwakura | G06N 3/08 |

OTHER PUBLICATIONS

Xu et al., "RC-NET: A General Framework for Incorporating Knowledge into Word Representations", CIKM'14, Proceedings of the 23rd ACM international Conference on Information and Knowledge Management, ACM, Shanghai, China, Nov. 3-7, 2014.

Bengio et al., "A Neural Probabilistic Language Model", Journal of Machine Learning Research 3, 2003, pp. 1137-1155.

Mikolov et al., "Efficient Estimation of Word Representations in Vector Space", In proceedings of workshop at ICLR, Sep. 7, 2013, pp. 1-12.

* cited by examiner

FIG. 2

| DOCUMENT ID | DOCUMENT | ... |
|---|---|---|
| s1 | I wrote a memo in my notebook on the table. | |
| s2 | I switched off my notebook on the table. | |
| s3 | He created a table with my notebook. | |
| ... | | |
| s42 | I left a memo in my notebook on the desk. | |
| ... | | |
| s104 | I turned off my laptop on the table. | |
| ... | | |

FIG. 3

| WORD ID | WORD | ... |
|---|---|---|
| w1 | I | |
| w2 | wrote | |
| w3 | a | |
| w4 | memo | |
| w5 | in | |
| w6 | my | |
| w7 | notebook | |
| w8 | on | |
| w9 | the | |
| w10 | Table | |
| w11 | switched | |
| w12 | off | |
| w13 | He | |
| w14 | created | |
| ... | | |

FIG. 4A

| CONTEXT ID | CONTEXT | ... |
|---|---|---|
| c1 | (0,1,1,1,1,1,1,1,1,1,0,0,0,0···) | |
| c2 | (0,0,0,0,0,1,1,1,1,1,1,1,0,0···) | |
| c3 | N/A  1111 | |
| ... | | |
| c42 | (0,0,1,1,1,1,1,1,1,0,0,0,0,0···) | |
| ... | | |
| c104 | (0,0,0,0,0,1,0,1,1,1,0,1,0,0···) | |
| ... | | |

| CONTEXT ID | CONTEXT | ... |
|---|---|---|
| c1 | (1,0,1,1,1,1,1,1,1,1,0,0,0,0···) | |
| c2 | N/A | |
| c3 | N/A  1211 | |
| ... | | |
| c42 | N/A | |
| ... | | |
| c104 | N/A | |
| ... | | |

| CONTEXT ID | CONTEXT | ... |
|---|---|---|
| c1 | (1,1,1,1,1,1,0,1,1,1,0,0,0,0...) | |
| c2 | (1,0,0,0,0,1,0,1,1,1,1,1,0,0...) | |
| c3 | (0,0,1,0,0,1,0,1,1,1,0,0,1,1...) | |
| ... | /-1301 | |
| c42 | (1,0,1,1,1,1,0,1,1,0,0,0,0,0...) | |
| ... | | |
| c104 | N/A | |
| ... | | |

FIG. 4D

| CONTEXT ID | CONTEXT | ... |
|---|---|---|
| c1 | (1,1,1,1,1,1,1,1,1,0,0,0,0,0...) | |
| c2 | (1,0,0,0,0,1,1,1,1,0,1,1,0,0...) | |
| c3 | (0,0,1,0,0,1,0,1,1,0,0,0,1,1...) | |
| ... | /-1401 | |
| c42 | N/A | |
| ... | | |
| c104 | (1,0,0,0,0,1,0,1,1,0,0,1,0,0...) | |
| ... | | |

FIG. 5

| WORD ID | CLUSTER ID | CONTEXT ID | ... |
|---|---|---|---|
| w1 | cluster1 | c1,c2,c4, c5···c42···c104··· | |
| ... | | | |
| w7 | cluster1 | c1,···c42,··· | 2001 |
| w7 | cluster2 | c2, c3,··· | |
| ... | | | |
| w10 | cluster1 | c1,c2,c3,c7,c8···c104··· | 2002 |

FIG. 6

| WORD ID | DOCUMENT | ... |
|---|---|---|
| w1 | I | |
| w2 | wrote | |
| w3 | a | |
| w4 | memo | |
| w5 | in | |
| w6 | my | |
| w7_1 | notebook_1 | |
| w7_2 | notebook_2 | |
| w8 | on | |
| w9 | the | |
| w10 | Table | |
| w11 | switched | |
| w12 | off | |
| w13 | He | |
| w14 | created | |
| ... | | |

| CONTEXT ID | CONTEXT | ... |
|---|---|---|
| c1 | (1,1,1,1,1,1,0,1,1,1,0,0,0,0,0...) | |
| c2 | (1,0,0,0,0,1,0,1,1,1,0,1,1,0,0...) | |
| c3 | (0,0,1,0,0,1,1,0,1,1,0,0,0,1,1...) | |
| ... | | |
| c42 | N/A | |
| ... | | |
| c104 | (1,0,0,0,0,1,0,0,1,1,0,0,1,0,0...) | |
| ... | | |

| WORD ID | CLUSTER ID | CONTEXT ID | ... |
|---|---|---|---|
| w1 | cluster1 | c1, c2, c4, c5···c42···c104··· | |
| ... | | | |
| w7_1 | cluster1 | c1,···c42,··· | |
| w7_2 | cluster1 | c2, c3,··· | |
| ... | | | |
| W10_1 | cluster1 | c1, c2, c8···c104,··· | |
| W10_2 | cluster1 | c3, c7··· | |
| ... | | | |

2101 (w7_1, w7_2 rows)
2102 (W10_1, W10_2 rows)

FIG. 9

| WORD ID | DOCUMENT | ... |
|---------|----------|-----|
| w1 | I | |
| w2 | wrote | |
| w3 | a | |
| w4 | memo | |
| w5 | in | |
| w6 | my | |
| w7_1 | notebook_1 | |
| w7_2 | notebook_2 | |
| w8 | on | |
| w9 | the | |
| w10_1 | table_1 | |
| w10_2 | table_2 | |
| w11 | switched | |
| w12 | off | |
| w13 | He | |
| w14 | created | |
| ... | | |

CLUSTERED AS FOLLOWS w1(I):c1, c2, c4, c5⋯c42⋯c104⋯

...

w7_1(notebook_1):c1, ⋯c42,⋯
w7_2(notebook_2):c2, c3,⋯

...

w10_1(table_1):c1, c2,c8,⋯c104⋯
w10_2(table_2):c3,c7⋯

LEARNING APPARATUS AND LEARNING METHOD

CROSS-REFERENCE TO RELATED APPLICATION

This application is based upon and claims the benefit of priority of the prior Japanese Patent Application No. 2017-68551, filed on Mar. 30, 2017, the entire contents of which are incorporated herein by reference.

FIELD

The embodiments discussed herein are related to a learning technique.

BACKGROUND

In the sentence processing, it has been known to acquire the expression of words by using vectors of words that co-occur (appear at the same) in one sentence. According to one conventional technique of learning the word dispersion expression using the vectors, in clustering a polyseme having a plurality of meanings in the same surface layer, even the polyseme in the same surface layer is learnt as different words. Hereinafter, when the notation of the word is described without considering the meaning of the word, the notation may be expressed as "surface layers".

For example, in one known technique, each word in an inputted predetermined sentence is extracted, and any word is selected as a core word to extract a core-word co-occurrence vector represented by a core-word co-occurrence word that has a co-occurrence relation with the core word, and the number of co-occurrences. According to the technique, the co-occurrence word concept of each core word co-occurrence word of the core-word co-occurrence vector is estimated from the general concept, and for a group of estimated co-occurrence word concepts, each core word co-occurrence word for a selected core word is clustered, based on the similarity between the co-occurrence word concepts. Further, according to the technique, when a plurality of clusters are present, a candidate for polyseme is extracted.

In another known technique, a sentence is inputted, statistics on words and the co-occurrence frequency of the words in a specific context are gathered, and the words are classified as a probability model estimation problem to output the word classification. According to the technique, a word automatic classification problem is regarded as the estimation problem of the probability model defined on a direct product of two word sets. According to the technique, using the information criterion, the probability model is selected from probability models that defines the occurrence probability of each word pair as the probability found by multiplying the occurrence probability of the cluster pair by the conditional probability of each word, and the two word sets are alternately clustered in a bottom-up manner.

Related techniques are disclosed in, for example, Japanese Laid-open Patent Publication Nos. 2013-020431 and 11-143875, Tomas Mikolov, Kai Chen, Greg Corrado, and Jeffrey Dean. "Efficient Estimation of Word Representations in Vector Space", In Proceedings of Workshop at ICLR, 2013, Xu Chang et al. "Rc-net: A general framework for incorporating knowledge into word representations", Proceeding of the 23rd ACM International Conference on Conference on Information and knowledge Management. ACM, 2014, Bengio, Yoshua, et al. "A neural probabilistic language model" Journal of machine learning research 3. Feb. (2003): 1137-1155, Guo, Jiang, et al. "Learning Sense-specific Word Embeddings By Exploiting Bilingual Resources" COLING. 2014.

SUMMARY

According to an aspect of the invention, a learning apparatus includes a memory and a processor configured to acquire a plurality of documents, perform clustering of the plurality of documents for each of a plurality of words included in the plurality of document, when a plurality of clusters are generated for a first word among the plurality of words by the clustering, perform assignment of different labels corresponding to the plurality of clusters to the first word included in the plurality of documents, and perform re-clustering of the plurality of documents including the first word with the assigned different labels, for other words among the plurality of words.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a learning corpus in Embodiment 1;

FIG. 3 illustrates an example of a word dictionary in Embodiment 1;

FIG. 4A illustrates an example of a context storage section in Embodiment 1;

FIG. 4B illustrates another example of the context storage section in Embodiment 1;

FIG. 4C illustrates another example of the context storage section in Embodiment 1;

FIG. 4D illustrates another example of the context storage section in Embodiment 1;

FIG. 5 illustrates an example of a cluster storage section in Embodiment 1;

FIG. 6 illustrates an example of the word dictionary after the first distributed learning in Embodiment 1;

FIG. 7 illustrates an example of the context storage section after the first distributed learning in Embodiment 1;

FIG. 8 illustrates an example of the cluster storage section after the second distributed learning in Embodiment 1;

FIG. 9 illustrates an example of the word dictionary after the second distributed learning in Embodiment 1;

FIG. 12 illustrates an example of an output result in Embodiment 1;

DESCRIPTION OF EMBODIMENTS

According to the conventional techniques, the word having a plurality of meanings in the same surface layer may be identified. However, word distributed learning is not performed according to the plurality of identified meanings. For this reason, the clustering accuracy may be insufficient, failing to perform distributed learning with high accuracy.

Embodiments of a learning apparatus, a learning method, and a learning program in this application will be described below with reference to figures. Noted that the disclosure is not limited to the embodiments. The below-mentioned embodiments may be combined so as not to cause contradiction.

The following embodiments address distributed learning of an English document including a word "notebook" having meanings "notebook" and "portable computer" and a word "table" having meanings "desk" and "chart". The embodiments are limited to distributed learning of English documents, and may use documents in other languages including Japanese and Chinese.

Embodiment 1

[Functional Block]

Figure 1:
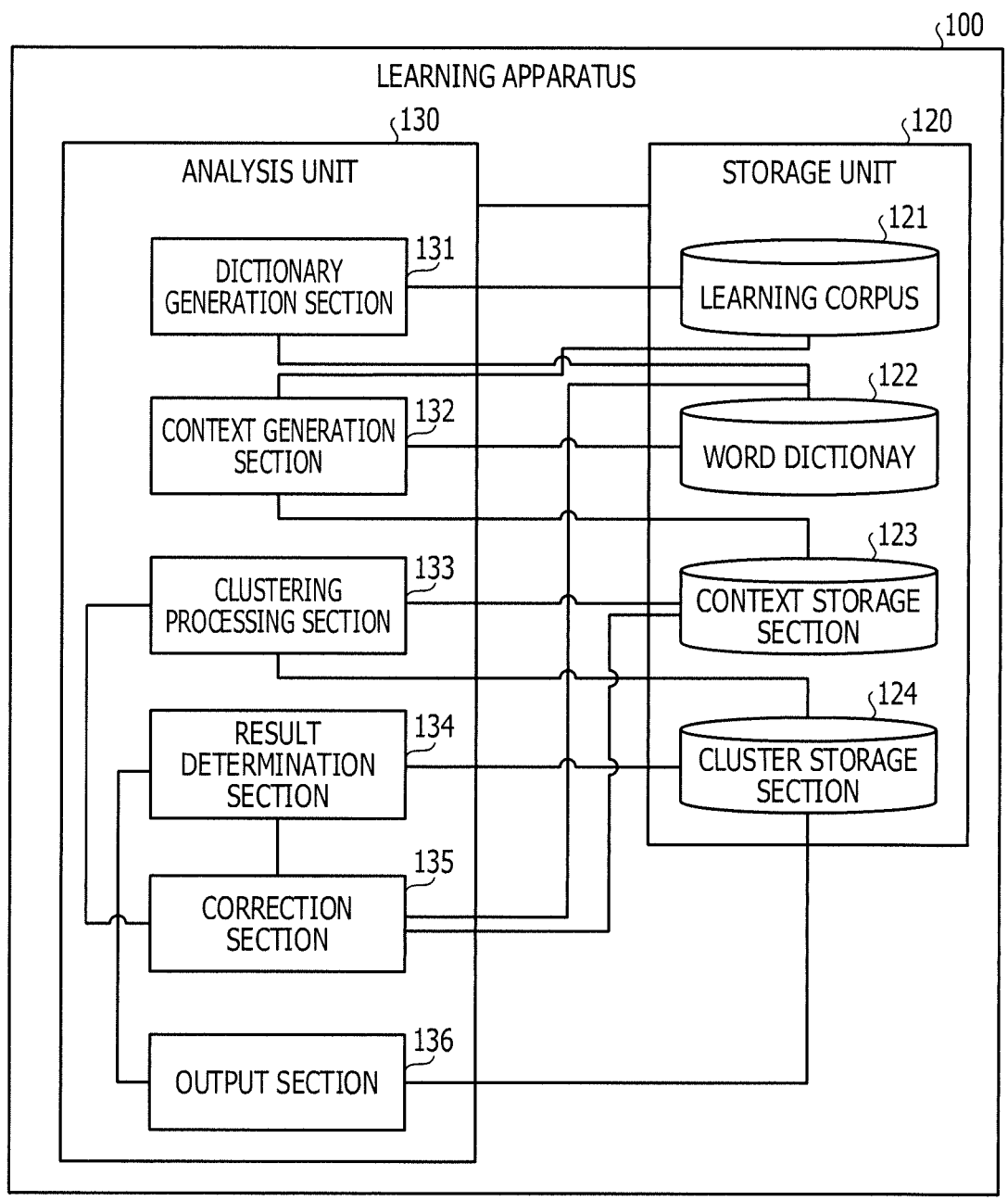
FIG. 1 illustrates an example of a learning apparatus in Embodiment 1.

An example of the learning apparatus in an embodiment will be described below with reference to FIG. 1. FIG. 1 illustrates an example of a learning apparatus in Embodiment 1. As illustrated in FIG. 1, the learning apparatus 100 in this embodiment has a storage unit 120 and an analysis unit 130.

For example, the storage unit 120 stores various data such as a program executed by the analysis unit 130. The storage unit 120 further has a learning corpus 121, a word dictionary 122, a context storage section 123, and a cluster storage section 124. The storage unit 120 corresponds to semiconductor memory elements such as random access memory (RAM), read only memory (ROM), flash memory, and storage devices such as hard disk drive (HDD).

The learning corpus 121 is a corpus used for learning. The corpus represents a collection of sentences. FIG. 2 illustrates an example of the learning corpus in Embodiment 1. As illustrated in FIG. 2, the learning corpus 121 associates a plurality of "documents" with respective "document IDs" (Identifiers) for uniquely identifying the documents, and stores them. For example, the learning corpus 121 associates the document "I wrote a memo in my notebook on the table." with a document ID "s1", and stores them. The learning corpus 121 also stores information acquired via a communication unit not illustrated in advance. As illustrated in FIG. 2, the "document" in this embodiment is one sentence and however, the document may have a plurality of sentences.

Next, the word dictionary 122 stores words extracted from the document stored in the learning corpus 121. FIG. 3 illustrates an example of the word dictionary in Embodiment 1. As illustrated in FIG. 3, for example, the word dictionary 122 associates words in the document having the document ID "s1" in the learning corpus 121 with respective words ID "w1" to "w10", which are identifiers for uniquely identifying the words, and stores them. Similarly, the word dictionary 122 associates unregistered words "switched" and "off" in the document having the document ID "s2" in the learning corpus 121 with the words ID "w11" and "w12", respectively, and stores them. The information stored in the word dictionary 122 is inputted by a below-mentioned dictionary generation section 131. The word dictionary 122 may be configured to associate one word as well as a phrase consisting of a plurality of words with the word ID, and store them.

Next, the context storage section 123 stores contexts represented in vectors of words that co-occur in the sentence appearing in a corpus (bag of words). The context in this embodiment is generated for each document ID stored in the learning corpus 121. The context in this embodiment is individually generated for each word to be estimated, even in one document. For this reason, the context storage section 123 in this embodiment has one table for each word stored in the word dictionary 122. The information stored in the context storage section 123 is inputted by a below-mentioned context generation section 132, and is updated by a below-mentioned correction section 135.

The information stored in the context storage section 123 in this embodiment will be described with reference to FIGS. 4A to 4D. FIG. 4A illustrates an example of the context storage section in Embodiment 1. FIG. 4A is a table that stores contexts of the word "I" having the word ID "w1", which is stored in the word dictionary 122. As illustrated in FIG. 4A, the context storage section 123 associates the "contexts" with the respective "context IDs" that are identifiers for uniquely identifying the contexts, and stores them. The context ID corresponds to the document ID stored in the learning corpus 121 in a one to one relationship. That is, the context ID "c1" illustrated in FIG. 4A represents the contexts of the document having the document ID "s1" in FIG. 2, which is generated for the word to be estimated "w1". Similarly, the context ID "cn" in FIG. 4A represents the context of the document having the document ID "sn" in FIG. 2, which is generated for the word to be estimated "w1".

As illustrated in FIG. 4A, the context in this embodiment is represented in vector as 1 for the word that appears in the document, and as 0 for the word that does not appear in the document. In FIG. 4A, a first term of the vector indicates whether or not the word having the word ID "w1" in the word dictionary 122 appears. Similarly, a $n^{th}$ term of the vector in FIG. 4A indicates whether or not the word having the word ID "wn" in the word dictionary 122 appears. However, in the context in this embodiment, a value of a term of the word to be estimated is invariably represented in as "0". In FIG. 4A, since the context of the word ID "w1" is stored, as represented by a reference number 1101 in FIG. 4A, a value of the first term of each context is invariably "0". Since the word "I" does not appear in the document having the document ID "s1" corresponding to the context ID "c3", as represented by a reference number 1111 in FIG. 4A, the context storage section 123 stores that the context having the context ID "c3" is "N/A" (no applicable).

Next, contents corresponding to other words in the context storage section 123 will be described. FIGS. 4B to 4D each illustrate another example of the context storage section in Embodiment 1. FIG. 4B is a table that stores contexts of the word "wrote" having the word ID "w2" stored in the word dictionary 122 and thus, as represented by a reference number 1201 in FIG. 4B, a value of a second term of each context is invariably "0". The word "wrote" does not appear in the documents corresponding to the context IDs "c2", "c3", "c42", and "c104". For this reason, as represented by a reference number 1211 in FIG. 4B, the context storage section 123 stores that the contexts having the context IDs "c2", "c3", "c42", and "c104" are "N/A".

Next, FIG. 4C is a table that stores contexts of the word "notebook" having the word ID "w7", which is stored in the word dictionary 122. As represented by a reference number 1301 in FIG. 4C, a value of a seventh term of each context is invariably "0". Similarly, FIG. 4D is a table that stores contexts of the word "table" having the word ID "w10", which is stored in the word dictionary 122. As represented by a reference number 1401 in FIG. 4D, a value of a tenth term of each context is invariably "0".

As illustrated in FIG. 5, the cluster storage section 124 stores clusters including contexts of the word, which are identified by below-mentioned processing of classifying the clusters, for each word to be estimated. FIG. 5 illustrates an example of a cluster storage section in Embodiment 1. As illustrated in FIG. 5, the cluster storage section 124 associates the "cluster IDs" and the "context IDs" with the respective "word IDs", and stores them.

In FIG. 5, the "cluster ID" is an identifier for uniquely identifying the word to be estimated. For example, as represented by a reference number 2001 in FIG. 5, the cluster storage section 124 stores information indicating that two clusters having the cluster IDs "cluster 1" and "cluster 2" are identified as clusters including the word "notebook" having the word ID "w7". As represented by a reference number 2002 in FIG. 5, the cluster storage section 124 stores information indicating that one cluster includes the word "table" having the word ID "w10".

Next, the analysis unit 130 is a processing unit that manages processing of a learning apparatus 100 as a whole. For example, the analysis unit 130 is embodied by causing a central processing unit (CPU) or a micro processing unit (MPU) to execute a program stored in an internal storage device in a RAM as a working area. The control unit 130 may be embodied as an integrated circuit such as an application specific integrated circuit (ASIC) or a field programmable gate array (FPGA). The analysis unit 130 has the dictionary generation section 131, the context generation section 132, a clustering processing section 133, a result determination section 134, correction section 135, and an output section 136. The dictionary generation section 131, the context generation section 132, the clustering processing section 133, the result determination section 134, the correction section 135, and the output section 136 are examples of an electronic circuit of a processor or a process executed by the processor.

The dictionary generation section 131 reads a document from the learning corpus 121, and extracts words from the document. The dictionary generation section 131 extracts the words from the document according to publicly known morphological analysis or word division method. As illustrated in FIG. 3, the dictionary generation section 131 assigns the word IDs to the extracted words, and stores them in the word dictionary 122.

Next, the context generation section 132 generates contexts from each document stored in the learning corpus 121 for each word stored in the word dictionary 122. For example, the context generation section 132 addresses the document having a specific document ID, which is stored in the learning corpus 121, and generates, for example, contexts having all terms of "0". Next, the context generation section 132 identifies any word ID stored in the word dictionary 122.

Next, the context generation section 132 determines whether or not each word having the word ID other than the identified word ID in the word dictionary 122 is included in each document stored in the learning corpus 121. When determining that the word is included in the document, the context generation section 132 sets a value of a term of the context corresponding to the word ID of the word to "1". Then, the context generation section 132 repeats processing on the words having all word IDs other than the identified word ID in the word dictionary 122, thereby generating contexts of the document having the identified document ID. The context generation section 132 repeatedly generates contexts of the documents having all document IDs, and stores contexts as illustrated in FIGS. 4A to 4D in the context storage section 123.

When receiving a context update instruction from the correction section 135 described later, the context generation section 132 updates the contexts stored in the context storage section 123. The updated contexts will be described later.

Next, the clustering processing section 133 clusters the contexts stored in the context storage section 123. For example, according to the publicly-known clustering technique, the clustering processing section 133 calculates the distance between the contexts, and brings a set of adjacent clusters into one cluster. The cluster will be illustrated later. Then, the clustering processing section 133 stores a clustering processing result as is represented in FIG. 5 in the cluster storage section 124.

When receiving a re-clustering processing instruction from the correction section 135 described later, the clustering processing section 133 in this embodiment refers to the word dictionary 122 to repeat the clustering processing.

Next, referring to the cluster storage section 124, the result determination section 134 determines whether or not the clustering processing produces a new cluster. When determining that the clustering processing produces a new cluster, the result determination section 134 instructs the correction section 135 to correct the word dictionary 122. On the contrary, when determining that the clustering processing does not produces a new cluster, the result determination section 134 instructs the output section 136 to output a clustering result.

Next, the correction section 135 assigns a label to the word having a new cluster. The correction section 135 updates the word dictionary 122 using the word with the assigned label. FIG. 6 illustrates an example of the word dictionary after the first distributed learning in Embodiment 1. As represented by a reference number 3001 in FIG. 6, the correction section 135 assigns labels "notebook_1" and "notebook_2" to the word "notebook" including two clusters. Then, the correction section 135 associates the words with the assigned labels "notebook_1" and "notebook_2" with the word ID "w7_1" and "w7_2", respectively, and stores the words as new words in the word dictionary 122.

Further, using the updated word dictionary 122, the correction section 135 updates the contexts, or generates new contexts. The contexts updated by the correction section 135 are described with reference to FIG. 7. FIG. 7 illustrates an example of the context storage section after the first distributed learning in Embodiment 1. In the example illustrated in FIG. 7, contexts of the word "table" having the word ID "w7" in FIG. 4D are updated by assigning the new labels "w7_1" and "w7_2" to the word ID "w7". As represented by a reference number 1801 in FIG. 7, in the updated contexts, a seventh term is divided into a term representing "w7_1" and a term representing "w7_2". As represented by a reference number 1801 in FIG. 7, the contexts "c1" and "c2" include the word ID "w7_2", and the context "c3" includes the word ID "w7_1".

Further, the correction section 135 instructs the clustering processing section 133 to newly execute clustering processing using the updated word dictionary 122. A result of the new clustering processing of the clustering processing section 133 will be described with reference to FIGS. 8 and 9. FIG. 8 illustrates an example of the cluster storage section after second distributed learning in Embodiment 1. The words having the word IDs "w7_1" and "w7_2" represented by a reference number 2101 in FIG. 8 were once one word including two clusters. Labels are assigned to the words to become the two distinct words each having a cluster. Thus, the word IDs "w7_1" and "w7_2" each include only one cluster.

As represented by a reference number 2102 in FIG. 8, in the word having the word ID "w10", as a result of classification of the contexts updated using the word IDs "w7_1" and "w7_2" with the newly-assigned labels into clusters, it is identified that two clusters are included. In this case, the result determination section 134 determines that the clustering processing produces a new cluster, and instructs the correction section 135 to correct the word dictionary 122 again. FIG. 9 illustrates an example of the word dictionary after second distributed learning in Embodiment 1. As represented by a reference number 3101 in FIG. 9, different words ID "w10_1" and "w10_2" are assigned to the word having the word ID "w10" including two clusters.

Figure 10:
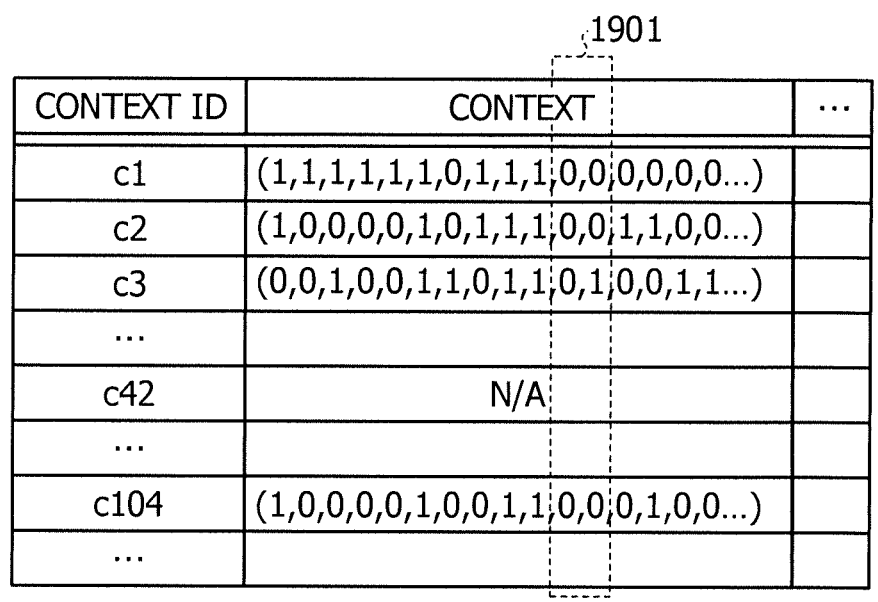
FIG. 10 illustrates an example of the context storage section after the second distributed learning in Embodiment 1.

Further, using the updated word dictionary 122, the correction section 135 updates the contexts again or newly generates contexts. The contexts newly generated by the context generation section 132 will be described with reference to FIG. 10. FIG. 10 illustrates an example of the context storage section after the second distributed learning in Embodiment 1. FIG. 10 illustrates contexts of the word "notebook_1" having the label "w10_1" newly generated when new labels "w10_1" and "w10_2" are assigned to the word ID "w10". As represented by a reference number 1901 in FIG. 10, in the updated contexts, a tenth term is divided into a term representing "w10_1" and a term representing "w10_2". As represented by a reference number 1901 in FIG. 10, the term representing the word ID "w10_1" is invariably "0", and in the term representing the word ID "w10_2", "1" is stored in the context corresponding to the document including the word ID "w10_2". That is, as represented by the reference number 1901 in FIG. 10, the contexts "c1" and "c2" include the word ID "w10_1", and the context "c3" include the word ID "w10_2".

Until the result determination section 134 determines that the clustering processing does not produce any new cluster, the correction section 135 and the clustering processing section 133 repeat processing.

Figure 11A:
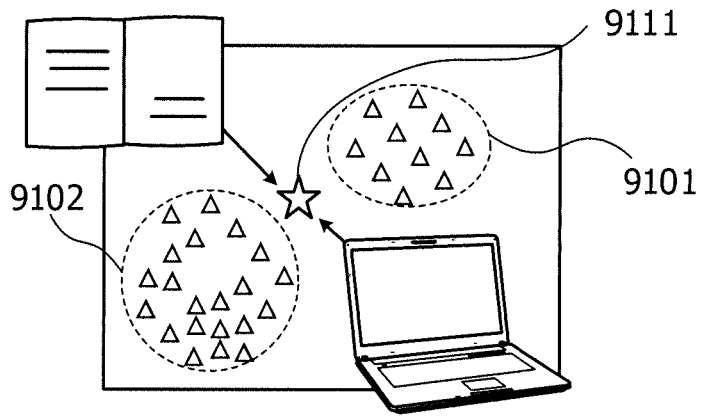
FIGS. 11A, 11B, and 11C illustrate examples of a clustering result in Embodiment 1.
Figure 11B:
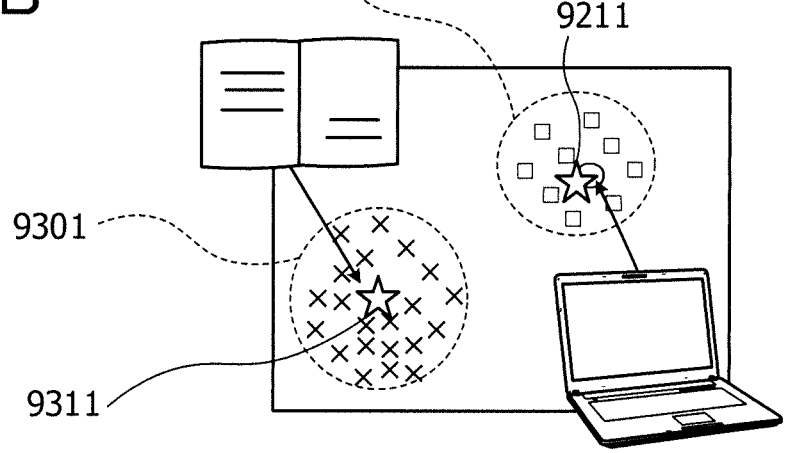
Figure 11C:
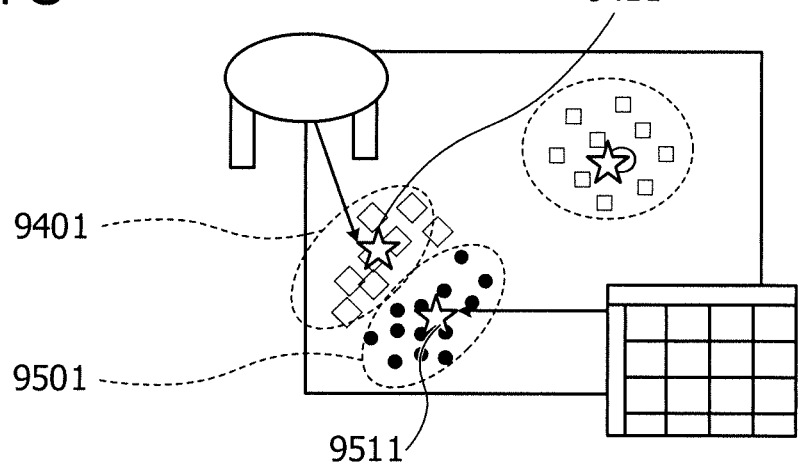

Results of the above-mentioned processing will be described with reference to FIGS. 11A, 116, and 11C. FIGS. 11A, 11B, and 11C illustrate examples of the clustering result in Embodiment 1. FIG. 11A illustrates an example of the clustering result before assigning a label to the word "notebook" having the word ID "w7". In FIG. 11A, the distribution of the contexts of the word "notebook" includes two clusters 9101 and 9102. In this case, since a center 9111 of the distribution of the contexts of the word "notebook" is a midpoint between the two clusters, the learning apparatus 100 may not distinguish the two clusters from each other in meaning.

Next, FIG. 11B illustrates an example of the clustering result in the case where a label is assigned to the word "notebook" having the word ID "w7". In FIG. 11B, the word "notebook_1" having the word ID "w7_1" corresponding to "computer" and the word "notebook_2" having the word ID "w7_2" corresponding to "notebook" constitute different clusters 9201 and 9301, respectively. The clusters 9201 and 9301 have respective centers 9211 and 9311. Thus, the learning apparatus 100 may grasp different meanings of the word "notebook".

Next, FIG. 11C illustrates an example of the clustering result in the case where a label is also assigned to the word "table" having the word ID "w10". In FIG. 11C, the word "table_1" having the word ID "w10_1" corresponding to "desk" and the word "table_2" having the word ID "w10_2" corresponding to "chart" constitute different clusters 9401 and 9501, respectively. Further, the clusters 9401 and 9501 have different centers 9411 and 9511, respectively. Therefore, the learning apparatus 100 may grasp different meanings of the word "table".

Returning to FIG. 1, the output section 136 refers to the cluster storage section 124, and outputs the result of the clustering processing. FIG. 12 illustrates an example of the output result in Embodiment 1. As illustrated in FIG. 12, as a result of the clustering processing, the output section 136 lists contexts included in the cluster for each word to be estimated. The output section 136 lists contexts included in the cluster for the labelled word IDs "w7_1", "w7_2", "w10_1", and "w10_2" as different words. The output section 136 may output a graph representing the clustering results as illustrated in FIGS. 11A, 11B, and 11C.

The output section 136 outputs a screen as illustrated in FIG. 12 to a display unit not illustrated in the learning apparatus 100. The output section 136 may transmit data that causes the screen as illustrated in FIG. 12 to be displayed, to other computers via a communication unit not illustrated.

[Processing Flow]

Figure 13:
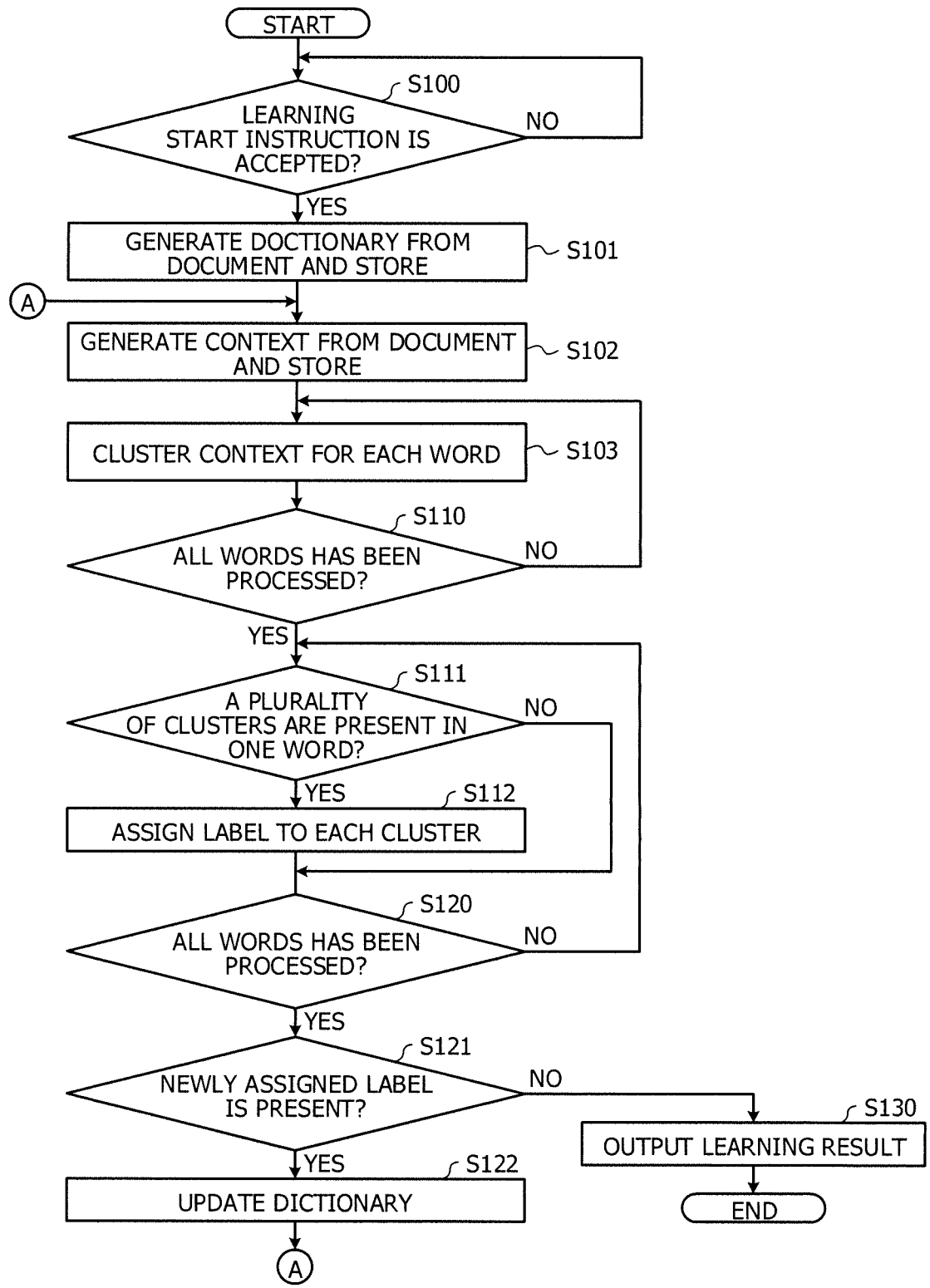
FIG. 13 is a flow chart illustrating an example of learning processing in Embodiment 1.

Next, learning processing of the learning apparatus 100 in this embodiment will be described with reference to FIG. 13. FIG. 13 is a flow chart illustrating an example of the learning processing in Embodiment 1. As illustrated in FIG. 13, the dictionary generation section 131 of the learning apparatus 100 waits until it accepts a learning start instruction from the user not illustrated via an operation unit not illustrated (S100: No). When accepting the learning start instruction (S100: Yes), the dictionary generation section 131 acquires a document from the learning corpus 121, extracts words, and stores the words in the word dictionary 122 (S101).

Next, referring to the learning corpus 121 and the word dictionary 122, the context generation section 132 generates contexts corresponding to the document, and stores the contexts in the context storage section 123 (S102). Next, the clustering processing section 133 clusters the contexts stored in the context storage section 123 for each word stored in the word dictionary 122 (S103). The clustering processing section 133 returns to S103 and repeats the processing until all of the words stored in the word dictionary 122 have been processed (S110: No).

When all of the words stored in the word dictionary 122 have been processed (S110: Yes), the clustering processing section 133 determines whether or not one word includes a plurality of clusters for each word (S111). When determining that one word includes a plurality of clusters (S111: Yes), the clustering processing section 133 assigns a label to each of the plurality of clusters (S112), and proceeds to S120. On the contrary, when determining that one word does not include a plurality of clusters (S111: No), the clustering processing section 133 proceeds to S120.

Until all of the words stored in the word dictionary 122 have been processed (S120: No), the clustering processing section 133 returns to S111 and repeats the processing. Then, when all of the words stored in the word dictionary 122 have been processed (S120: Yes), the result determination section 134 determines whether or not a newly assigned label is present in the word dictionary 122 (S121).

When determining that a newly assigned label is present in the word dictionary 122 (S121: Yes), the result determination section 134 instructs the correction section 135 to correct the word dictionary 122. The correction section 135 updates the word dictionary 122 (S122). Then, the correction section 135 instructs the clustering processing section 133 to execute the processing again, and proceeds to S102 through a terminal A.

On the contrary, when determining that a newly assigned label is not present in the word dictionary 122 (S121: No), the result determination section 134 instructs the output section 136 to output a learning result. Referring to the cluster storage section 124, the output section 136 outputs a screen as illustrated in FIG. 9 (S130), and finishes the processing.

[Effects]

As has been described, the learning apparatus in this embodiment classifies a plurality of documents into clusters using words included in the documents. When the document includes the words include a plurality of clusters, different labels are assigned to the words included in the document constituting each cluster. Then, when words with the newly assigned different labels are present, the learning apparatus in this embodiment repeats the classification processing using the words with the newly assigned different labels. In this manner, since the processing of classifying the word subdivided in meaning, the accuracy of the distributed learning may be improved.

The learning apparatus in this embodiment extracts words included in a plurality of documents, generates a dictionary, and refers to the generated dictionary to generate contexts representing words appearing in each document for each word included in the plurality of document. Then, the learning apparatus in this embodiment corrects the dictionary such that the word including a plurality of clusters becomes different words for clusters, and repeats the classification processing using the corrected dictionary. Thereby, the words may be classified according to the vector operation using contexts.

Further, as a result of the classification processing, the learning apparatus in this embodiment determines whether or not the document including a specific word includes a plurality of clusters. Then, when determining that the document including the word does not include a plurality of clusters, for all words, the learning apparatus in this embodiment outputs the result of the classification processing that includes the word stored in the corrected dictionary. This may readily grasp the result of the classification processing.

Embodiment 2

Although the embodiment of the disclosure has been described, the disclosure may be implemented in other various embodiments. For example, a part of the functional blocks of the learning apparatus 100 may be implemented in an external computer. For example, the learning apparatus 100 may omit the learning corpus 121, and access an external database via a communication unit not illustrated to acquire the learning corpus. The learning apparatus 100 may acquire the word dictionary from an external database in place of generating the word dictionary 122.

The context in this embodiment is expressed as a vector representing the word that appears in the document as "1" and the word that do not appear in the document as "0", and however, the disclosure is not limited to this embodiment. For example, the value of the context may be the number of times the word appears in the document. In this case, each term of the context may take value of 2 or more, in addition to "0" and "1".

[System]

Whole or a part of the automatically-executed processing among the processing described in this embodiment may be manually executed. Alternatively, whole or a part of the manually-executed processing in this embodiment may be automatically executed by any suitable publicly-known method. The processing procedure, the control procedure, specific names, and information including various data and parameters in the above description and figures may be changed as appropriate, unless otherwise specified.

Each component in the illustrated devices has conceptual function, and may not be physically configured as illustrated. That is, the devices are not limited to distribution or integration as illustrated, and whole or a part of the sections may be physically or functionally distributed or integrated in any suitable manner depending on loads and usage situations. Further, whole or a part of the processing executed by the devices may be implemented by a CPU or a program analyzed and executed by the CPU, or be implemented as hardware by wired-logic.

[Hardware Configuration]

Figure 14:
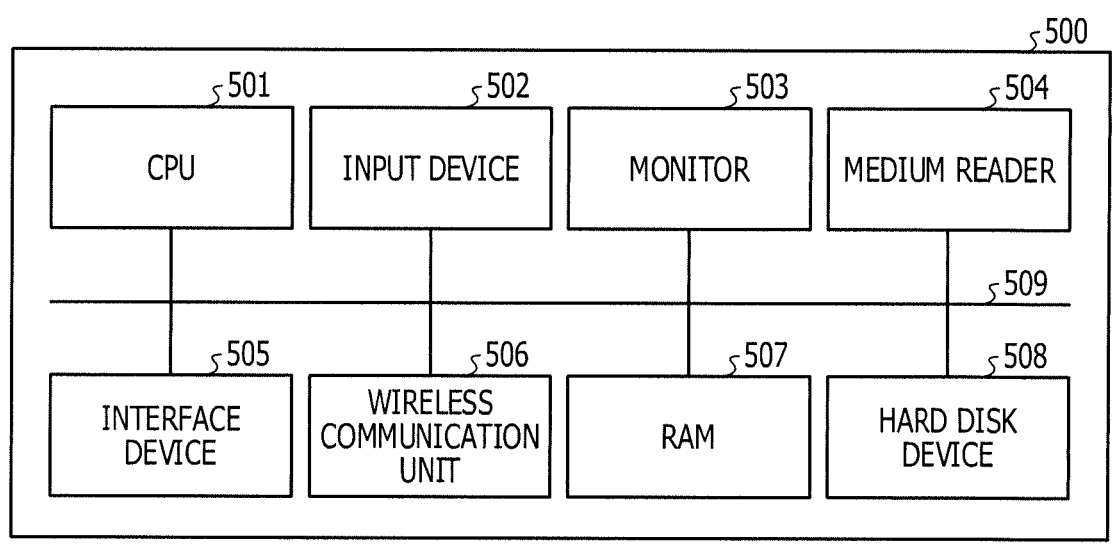
FIG. 14 illustrates an example of a hardware configuration of a computer.

FIG. 14 illustrates an example of a hardware configuration of a computer. As illustrated in FIG. 14, a computer 500 has a CPU 501 that execute various calculations, an input device 502 that accepts data inputted from the user, and a monitor 503. The computer 500 further has a medium reader 504 that reads a program and so on from a storage medium, an interface device 505 for connection to various devices, and a wireless communication device 506 for wireless communication with other devices. The computer 500 further has a RAM 507 that temporarily stores various information, and a hard disc device 508. The devices 501 to 508 are connected to a bus 509.

The hard disc device 508 stores an analysis program having the same function as the analysis unit 130 illustrated in FIG. 1. The hard disc device 508 further stores various data for executing the analysis program. Various data includes data in the storage unit 120 illustrated in FIG. 1.

The CPU 501 reads each program stored in the hard disc device 508, and expands and executes the programs in the RAM 507, thereby performing various processing. These programs may cause the computer 500 to function as each of the functional sections illustrated in FIG. 1.

It is noted that above-mentioned program is not necessarily stored in the hard disc device 508. For example, the computer 500 may read and execute a program stored in a computer-readable storage medium. Examples of the storage medium that may be read by the computer 500 include portable storage media such as CD-ROM, DVD disc, and Universal Serial Bus (USB) memory, semiconductor memories such as flash memory, and hard disc drive. Alternatively, the program may be stored in a device connected to public network, Internet, local area network (LAN), or the like, and the computer 500 may read the learning program from the device and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A learning apparatus comprising:
    a memory; and a processor coupled to the memory and the processor configured to:
acquire a plurality of words from a plurality of documents;
generate a plurality of contexts represented in a vector for each word of the plurality of words;
perform clustering of the plurality of contexts for each word of the plurality of words;
when a plurality of clusters are generated for a first word among the plurality of words by the clustering, perform assignment, to the first word, different labels corresponding to each cluster of the plurality of clusters;
generate first contexts for each first word distinguished by the assigned different labels; and
perform re-clustering of the plurality of contexts including the first contexts for each first word with the assigned different labels.

2. The learning apparatus according to claim 1, wherein the first word with the assigned different labels is treated as different words.

3. The learning apparatus according to claim 1, the processor further configured to:
extract the plurality of words from the plurality of documents to generate a word dictionary,
wherein each context of the plurality of contexts is to indicate whether each document of the plurality of documents includes each word of the plurality of words included in the word dictionary.

4. The learning apparatus according to claim 3, wherein the assignment includes changing the first word included in the word dictionary to a plurality of words with the assigned different labels.

5. The learning apparatus according to claim 1, the processor further configured to:
determine whether a plurality of second clusters for a second word for other words among the plurality of words are generated as a result of the re-clustering;
when the plurality of second clusters are generated for the second word, assign, to the second word, different labels corresponding to each cluster of the plurality of second clusters; and
perform other re-clustering of the plurality of contexts including the contexts for each second word with the assigned different labels.

6. The learning apparatus according to claim 5, the processor further configured to: when the plurality of second clusters are not generated for the second word, output information indicating a result of the re-clustering.

7. A learning method executed by a computer, the method comprising:
acquiring a plurality of words from a plurality of documents;
generating a plurality of contexts represented in a vector for each word of the plurality of words;
performing clustering of the plurality of contexts for each word of the plurality of words;
when a plurality of clusters are generated for a first word among the plurality of words by the clustering, performing assignment, to the first word, different labels corresponding to each cluster of the plurality of clusters;
generating first contexts for each first word distinguished by the assigned different labels; and
performing re-clustering of the plurality of contexts including the first contexts for each first word with the assigned different labels.

8. The learning method according to claim 7, wherein the first word with the assigned different labels is treated as different words.

9. The learning method according to claim 7, the method further comprising:
extracting the plurality of words from the plurality of documents to generate a word dictionary,
wherein each context of the plurality of contexts is to indicate whether each of the plurality of documents includes each of the plurality of words included in the word dictionary.

10. The learning method according to claim 9, wherein the assignment includes changing the first word included in the word dictionary to a plurality of words with the assigned different labels.

11. The learning method according to claim 7 further comprising:
determining whether a plurality of second clusters for a second word for other words among the plurality of words are generated as a result of the re-clustering;
when the plurality of second clusters are generated for the second word, assigning, to the second word, different labels corresponding to each cluster of the plurality of second clusters; and
performing other re-clustering of the plurality of contexts including the contexts for each second word with the assigned different labels.

12. The learning method according to claim 11 further comprising: when the plurality of second clusters are not generated for the second word, outputting information indicating a result of the re-clustering.

13. A non-transitory computer-readable medium storing a learning program that causes a computer to execute a process comprising:
acquiring a plurality of words from a plurality of documents;
generate a plurality of contexts represented in a vector for each word of the plurality of words;
performing clustering of the plurality of contexts for each word of the plurality of words;
when a plurality of clusters are generated for a first word among the plurality of words by the clustering, performing assignment, to the first word, different labels corresponding to each cluster of the plurality of clusters;
generate first contexts for each first word distinguished by the assigned different labels; and
performing re-clustering of the plurality of contexts including the first contexts for each first word with the assigned different labels.

* * * * *